United States Patent
Moore, Jr. et al.

(10) Patent No.: US 9,489,291 B2
(45) Date of Patent: **\*Nov. 8, 2016**

(54) CONTINUOUS INTEGRATION OF BUSINESS INTELLIGENCE SOFTWARE

(71) Applicant: Motio, Inc., Dallas, TX (US)

(72) Inventors: J. Lynn Moore, Jr., Lucas, TX (US); Lance W. Hankins, Allen, TX (US)

(73) Assignee: Motio, Inc., Dallas, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/613,594

(22) Filed: Feb. 4, 2015

(65) Prior Publication Data
US 2015/0154104 A1     Jun. 4, 2015

Related U.S. Application Data

(63) Continuation of application No. 13/369,210, filed on Feb. 8, 2012, now Pat. No. 8,972,349, which is a continuation of application No. 12/982,560, filed on Dec. 30, 2010, now Pat. No. 8,140,477, which is a continuation of application No. 11/324,603, filed on Jan. 3, 2006, now Pat. No. 7,885,929.

(51) Int. Cl.
G06F 17/00     (2006.01)
G06F 11/36     (2006.01)
G06Q 10/10     (2012.01)

(52) U.S. Cl.
CPC ....... *G06F 11/3688* (2013.01); *G06F 11/3684* (2013.01); *G06Q 10/10* (2013.01); *Y10S 707/944* (2013.01)

(58) Field of Classification Search
CPC   G06Q 10/10; G06F 11/3688; G06F 11/3684

USPC ................................................. 707/638, 695
See application file for complete search history.

(56) References Cited

U.S. PATENT DOCUMENTS

| 5,692,006 | A |  | 11/1997 | Ross |  |
|---|---|---|---|---|---|
| 5,987,628 | A |  | 11/1999 | Von Bokern et al. |  |
| 6,539,396 | B1 | * | 3/2003 | Bowman-Amuah | G06F 17/30607 |
|  |  |  |  |  | 707/769 |
| 6,542,841 | B1 | * | 4/2003 | Snyder | H04B 10/0795 |
|  |  |  |  |  | 372/26 |
| 7,243,090 | B2 |  | 7/2007 | Kinzhalin et al. |  |
| 7,505,991 | B2 | * | 3/2009 | Fifield | G06Q 10/00 |
|  |  |  |  |  | 707/999.103 |

(Continued)

OTHER PUBLICATIONS

Continuous Integration by Martin Fowler, et al.; www.martinfowler.com/articles/continuousIntegration.html; Oct. 14, 2005: pp. 1-9.

(Continued)

*Primary Examiner* — Phong Nguyen
(74) *Attorney, Agent, or Firm* — Griffith Bates Champion & Harper LLP; Shannon W. Bates

(57) ABSTRACT

Methods for automatically testing a business intelligence artifact include authoring a business intelligence artifact selected from the group consisting of a report specification, an analysis cube, and a metadata model; creating an assertion to verify the proper functioning of the business intelligence artifact; and testing, with an automated agent interfaced with the business intelligence system, the business intelligence artifact to verify its proper functioning by determining whether the conditions of the assertion are satisfied upon execution of the business intelligence artifact in the business intelligence system.

17 Claims, 2 Drawing Sheets

(56) References Cited

U.S. PATENT DOCUMENTS

| | | | |
|---|---|---|---|
| 7,720,879 B2 | 5/2010 | Tsyganskiy et al. | |
| 7,730,057 B2 | 6/2010 | Bell et al. | |
| 7,752,606 B2 | 7/2010 | Savage | |
| 7,930,149 B2* | 4/2011 | Haag | G06Q 10/087 700/97 |
| 7,945,589 B1 | 5/2011 | Weiss et al. | |
| 2002/0107886 A1 | 8/2002 | Gentner et al. | |
| 2002/0156785 A1* | 10/2002 | Kumar | G06F 11/0709 714/E11.027 |
| 2002/0198868 A1* | 12/2002 | Kinzhalin | G06F 11/3672 707/999.003 |
| 2003/0050886 A1* | 3/2003 | Cohen | G06Q 10/06 705/37 |
| 2003/0084429 A1* | 5/2003 | Schaefer | G06F 11/3664 717/125 |
| 2003/0204835 A1* | 10/2003 | Budhiraja | G06F 8/71 717/120 |
| 2004/0168115 A1* | 8/2004 | Bauernschmidt | G06F 17/2241 715/238 |
| 2004/0215916 A1* | 10/2004 | Bennett | G06F 11/0712 711/173 |
| 2005/0131964 A1 | 6/2005 | Saxena | |
| 2005/0229159 A1* | 10/2005 | Haba | G06F 11/368 717/122 |
| 2006/0041558 A1 | 2/2006 | McCauley et al. | |
| 2006/0123067 A1 | 6/2006 | Ghattu et al. | |
| 2006/0149784 A1 | 7/2006 | Tholl et al. | |
| 2006/0235732 A1* | 10/2006 | Miller | G06Q 10/06 705/7.23 |
| 2006/0241999 A1 | 10/2006 | Tsyganskiy et al. | |
| 2006/0277155 A1* | 12/2006 | Bell | G06F 9/5077 707/E17.032 |
| 2007/0033212 A1* | 2/2007 | Fifield | G06Q 10/00 707/999.102 |
| 2007/0038683 A1* | 2/2007 | Dixon | G06Q 10/10 707/E17.005 |
| 2007/0038977 A1* | 2/2007 | Savage | G06F 8/20 717/106 |
| 2007/0061154 A1* | 3/2007 | Markvoort | G06F 17/50 705/51 |
| 2007/0067254 A1* | 3/2007 | Chen | G06Q 10/10 707/999.001 |
| 2007/0106982 A1* | 5/2007 | Dalal | G06F 8/71 717/128 |
| 2007/0192113 A1* | 8/2007 | Sadowski | G06Q 10/06 705/1.1 |
| 2008/0183484 A1* | 7/2008 | Kondo | G05B 23/0272 705/1.1 |
| 2008/0250301 A1 | 10/2008 | Mukhopadhyay et al. | |

OTHER PUBLICATIONS

Dixon et al., U.S. Appl. No. 60/705,576, Business Intelligence System and Methods, Filed Aug. 4, 2005, 39 pages.

Cognos Incorporated, "Architecture and Planning Guide", Cognos Enterprise Bi Series—Cognos ReportNet Version 1.1.IMR2, 2004, pp. 1-5, 13-19 and 35-39 (17 total pages).

Cognos Incorporated, "Cognos Report Studio Users Guide", Cognos Enterprise Bl Series—Cognos ReportNet Version 1.1MR2, 2004, pp. 1-15, 21-33, and 93-95 (31 total pages).

Cognos Incorporated, "Framework Manager User Guide", Cognos Enterprise Bl Series—Cognos ReportNet Version 1.1.MR1, 2004, pp. 1-159.

"EBI Experts: Version Manager for Business Objects", Feb. 2004, available at http://web.archive.org/web/20050305091907/http://www.ebiexperts.com/products/vm4bo.html (3 pages).

Infosol, "Business Intelligence Solutions—Version Manager for Business Objects" product brochure, Sep. 20, 2005 (3 pages).

Kirk Haselden: "Editing a Package with SQL Server Integration Service Designer" and Figure 4, SQL Pro Magazine, Feb. 15, 2005 (5 pages).

Noad Business Intelligence BV, "EQM—Intelligent Thinking, Intelligent Results" overview brochure, Jan. 30, 2004 (4 pages).

Noad Business Intelligence BV, "Technical Insight, EQM—Intelligent Thinking, Intelligent Results" technical brochure, Oct. 13, 2004 (3 pages).

Software Forces, LLC, ".rpt Inspector softwareforces.com Product Information" product brochure, Aug. 2002 (5 pages).

".rpt Inspector 3 Enterprise Suite" annotated screen shot, Feb. 2005 from http://www.softwareforces.com/sites/default/files/RIES/screen-shots/featurEnt_14.jpg (1 page).

"Experience the Power and Scope of Software Forces . . . ", Dec. 1, 2005, at http://web.archive.org/ web/20051201032006/http://www.softwareforces.com/Product//product_index.htm (3 pages).

".rpt Inspector . . . : Features", May 11, 2006, at http://web.archive.org/web/20060511225959/http://www.softwareforces.com/Product/ri/ent/3_1/rptInspector_Features.htm (9 pages).

".rpt Inspector 3.1 Enterprise Suite . . . " annotated screen shot, Oct. 2006, at http://www.softwareforces.com/sites/default/files/RIES/screen-shots/ri3es%20Interface.jpg (1 page).

Continuous Integration (original version) by Martin Fowler, et al.; www.martinfowler.com/articles/originalcontinuousintegration.html; printed Jan. 11, 2011; published Sep. 10, 2000; pp. 1-6.

Continuous Integration by Martin Fowler, et al.; available at http://web.archive.org/web/20041208043705/http://www.martinfowler.com/articles/continuousintegration.html; published Dec. 8, 2004; pp. 1-6.

Rogers, R. Owen; "Scaling Continuous Integration;" Extreme Programming and Agile Processes in Software Engineering [Lecture Notes in Computer Science (LNCS)]; May 15, 2004; pp. 68-76; Springer-Verlag, Berlin/Heidelberg, Germany.

Roberts, Mike; "Enterprise Continuous Integration Using Binary Dependencies;" Extreme Programming and Agile Processes in Software Engineering [Lecture Notes in Computer Science (LNCS)]; May 15, 2004; pp. 194-201; Springer-Verlag, Berlin/Heidelberg, Germany.

* cited by examiner

CONTINUOUS INTEGRATION OF BUSINESS INTELLIGENCE SOFTWARE

CROSS REFERENCE TO RELATED APPLICATION

This application is a continuation of U.S. patent application Ser. No. 13/369,210, filed Feb. 8, 2012 entitled "Continuous Integration of Business Intelligence Software", which is a continuation of U.S. patent application Ser. No. 12/982,560, filed Dec. 30, 2010 and entitled "Continuous Integration of Business Intelligence Software", now U.S. Pat. No. 8,140,477, which is a continuation of U.S. patent application Ser. No. 11/324,603, filed Jan. 3, 2006 and entitled "Continuous Integration of Business Intelligence Software", now U.S. Pat. No. 7,885,929, each of which is hereby incorporated by reference for all purposes. This application is also related to U.S. patent application Ser. No. 12/982,620 filed Dec. 30, 2010 and entitled "Continuous Integration of Business Intelligence Software", now U.S. Pat. No. 8,285,678, which is hereby incorporated by reference for all purposes.

FIELD OF THE INVENTION

This invention relates to continuous integration of business intelligence software, and more particularly to establishing an automated agent that continuously monitors changes to, and the health and consistency of, a business intelligence software installation and its corresponding metadata models, report specifications, and analysis cubes, as well as the corresponding data sources that the business intelligence software analyzes.

BACKGROUND AND SUMMARY

Business intelligence systems are used in substantially all industries to gather, store, analyze, and report on business data or business intelligence. For example, manufacturing facilities use business intelligence systems to evaluate and report on factory production and personnel productivity as well as other critical metrics. Retailers use business intelligence systems to analyze trends in sales and to prepare reports for upper management.

Traditional business intelligence systems are not well-defined, predictable, or testable. For example, using traditional business intelligence systems to develop a report specification might be done as follows.

First, a business consumer requests a new report specification, and the task of creating the report specification is assigned to a report author skilled in the use of the report-authoring tool provided by the business intelligence software suite. While creating this report the report author might, for example, discover that the metadata model contained within the business intelligence software suite does not provide the information required for the report. The report author would in that case request that a change be made to the metadata model, and finish developing the report specification after the change is made.

Once the report author finishes the report specification it is sent to a quality inspector or directly to the business customer for testing. Whoever is testing the report must manually execute the report, visually inspect the report for defects, make notes about any defects found, and generate an error report that is returned to the report author for correction. The report author will attempt to make corrections to the report according to the new requirements provided in the notes. Once the report author corrects the report it is submitted for testing all over again, and this process continues until there are no errors found.

This process leads to numerous problems. First, if the metadata model is changed pursuant to the author's request, one or more previously created report specifications may fail to execute or produce incorrect results. Second, once a report specification is edited the previous version no longer exists and cannot be accessed for reference, or the previous version is stored in a content repository and is lost if the repository is lost or corrupted. Third, information stored in a repository cannot be accessed to convert an updated version having new errors back to a previous working version without errors. Last, there is no way to see the changes that have been made to the report specification, or to view recent outputs without manually running every report.

The present invention comprises a method and a system for applying continuous integration to business intelligence environments, including the business intelligence software installations, metadata models, report specifications, and analysis cubes, that overcomes the foregoing and other difficulties that have characterized the prior art. Continuous integration is a technique that has been practiced in the field of software development and is well known in the art. However, continuous integration has never been applied to business intelligence systems. The invention also employs version control, which is used to automatically record versions of business intelligence artifacts, including report specifications, metadata models, and analysis cubes.

The present invention applies continuous integration and automatic version control to improve the efficiency of developing, deploying, and altering business intelligence artifacts. In accordance with broader aspects of the invention, test cases can be defined for business intelligence artifacts. The test cases contain one or more assertions of characteristics that should be true of the business intelligence artifacts at a predetermined time. The assertions are used to verify that the business intelligence artifacts are working properly. There may be pre-execution assertions of characteristics that the business intelligence artifacts should possess before being executed, and post-execution assertions regarding characteristics of the outputs produced by execution of the business intelligence artifact. The test cases can be grouped into test suites and further into projects.

At a predetermined time interval, an automated agent executes any pre-execution assertions, executes the business intelligence artifact, stores the output of the execution of the business intelligence artifact and associates it with a version number, and executes any post-execution assertions. Any failures, or errors, are reported to the registered stakeholders, who are any persons with vested interests in the business intelligence artifacts, including business consumers, authors, etc. Thus, stakeholders are always assured that the system operates correctly and they are always aware of what has changed in the system.

By practicing the method of the present invention, business intelligence environments are better managed and more stable and predictable. Further, business intelligence artifact developers are able to better serve customers' ongoing needs by having the ability to update existing artifacts or revert to previously used artifacts without causing errors to or losing existing artifacts.

DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
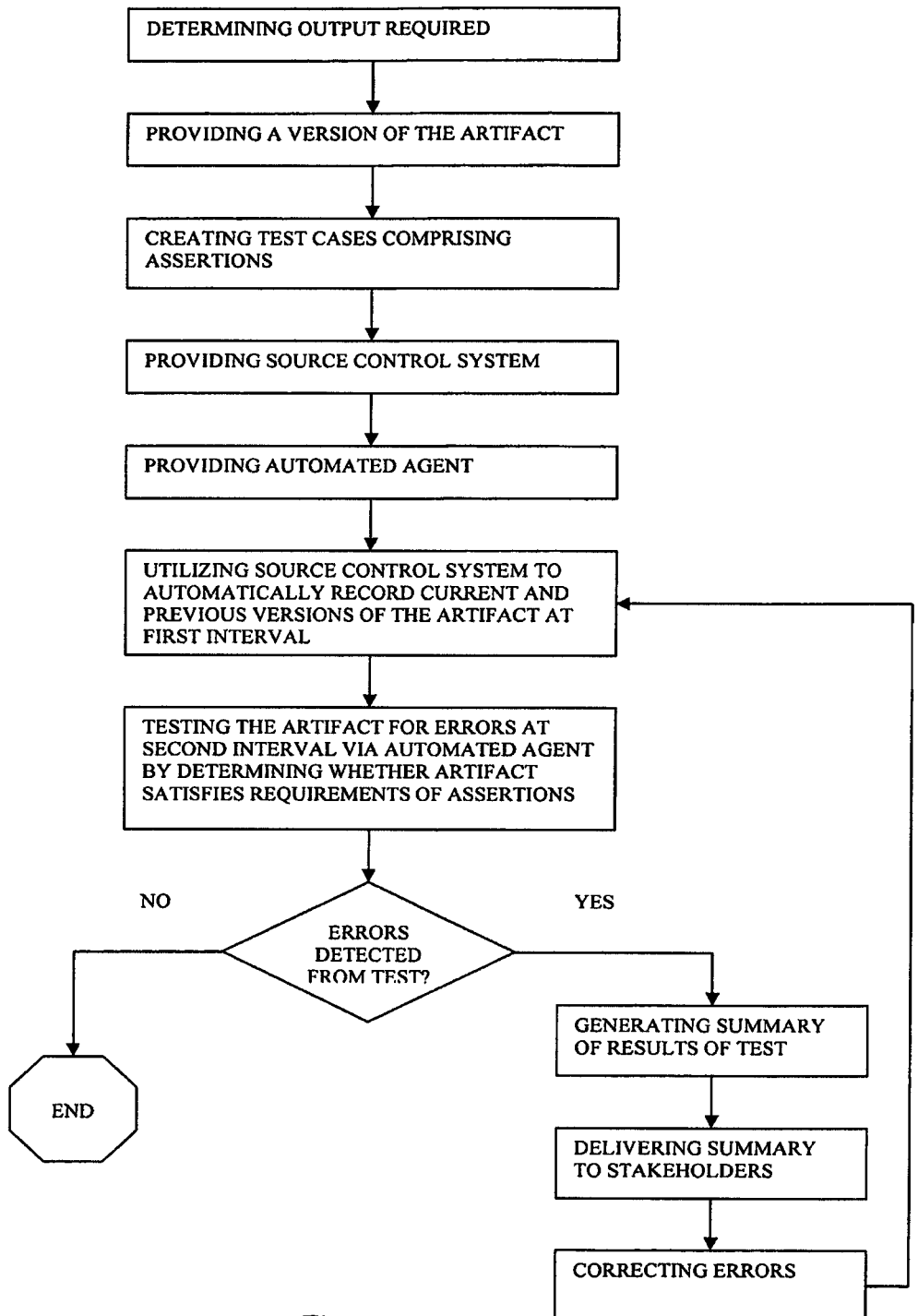
FIG. 1 is a flowchart illustrating one embodiment of the steps of the method of the present invention.

Referring now to the Drawings, and in particular to FIG. 1, there is shown a flowchart illustrating the steps of one embodiment of the invention. The method of continuous integration and automatic version control can be used in conjunction with any business intelligence artifacts, including report specifications, analysis cubes, metadata models, etc.

When a business intelligence artifact is requested by a stakeholder, typically a business consumer, the first step of the invention is determining the output required from the business intelligence artifact by the stakeholder. This output may be a new business intelligence artifact or the revision of an existing one. Thus, the next step is providing a version of the business intelligence artifact, either by developing an original version of the artifact or creating a revised version. The project of developing or revising a business intelligence artifact may be assigned to one or more authors.

An author may then create a test case for the business intelligence artifact comprising at least one assertion having requirements that should be satisfied by the business intelligence artifact at a predetermined time. A test case may comprise numerous assertions that are defined by the author, and multiple test cases may be created and grouped into test suites.

The assertions are used in the practice of the method to determine whether the business intelligence artifact is functioning properly. Examples of assertions are that the artifact is valid, has a specified name, has specified headers or footers, has specified colors, executes in a specified amount of time, produces a specified number of lines when executed, etc. The assertions may be requirements of the report specification before it is run or executed, i.e., pre-execution assertions, and requirements of the report specification after it is executed, i.e., post-execution assertions.

The creation of test suites, test cases, and assertions is subject to the needs and desires of the stakeholders, and can be varied in terms of the number of assertions created, the requirements established, and the time at which they are created during the process. In fact, assertions can be defined before the report authors begin building the business intelligence artifact as well as during the building of the artifact as the report authors prepare the artifact.

The method utilizes a source control system to record and maintain current and historical versions of the business intelligence artifacts during the development or revision of the business intelligence artifacts. The source control system records and saves the artifacts at a predetermined time interval that may be established to run every thirty (30) minutes, every hour, or at any other interval determined by the stakeholders of the business intelligence environment.

The method also utilizes an automated agent to test the business intelligence artifact at another predetermined time interval. This time interval may be set as frequently as every four (4) hours, as infrequently as once per day, or other time intervals as determined by the stakeholders of the business intelligence environment. Generally this predetermined time interval is longer than the predetermined time interval for the source control system.

The automated agent executes the most current version of the business intelligence artifact and all of the assertions to determine whether everything within the business intelligence artifact is working as expected. In one embodiment the automated agent may test the business intelligence artifact against pre-execution assertions to determine whether the artifact is valid, then execute the artifact, and finally test the results or output of the execution of the artifact against post-execution assertions to verify the results. This step of testing the business intelligence artifact is repeated for every test case that is created by an author.

The method of defining and running assertions is well known in the art of software development but has never been applied to business intelligence systems.

It is through testing of the artifact via the automated agent that the invention allows the artifact to be continuously integrated by the changes that are made thereto while monitoring and testing the artifact for errors that may result from those changes.

After the assertions and/or the business intelligence artifact are executed, a summary report of the results of the testing is created and made available to registered stakeholders. Then the authors that are responsible for the artifact can review any errors included within the report and make the necessary corrections. The authors may recognize additional assertions needed while making corrections and cause them to be executed during the next testing interval. The testing via the automated agent and the version control continues throughout the time that the business intelligence artifacts are corrected.

Figure 2:
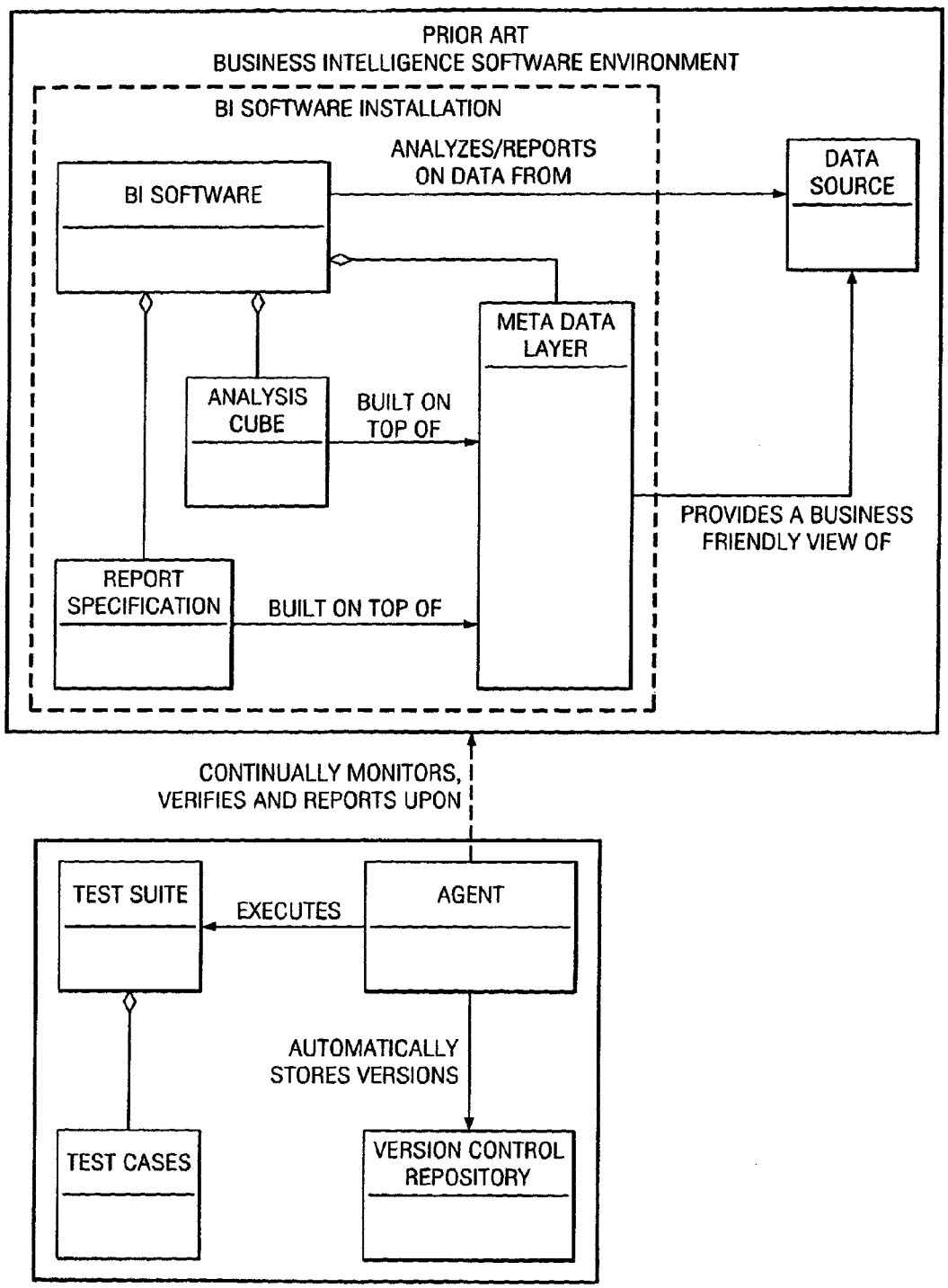
FIG. 2 is an analysis class diagram showing the system of the invention in conjunction with the business intelligence software that is known in the art.

In FIG. 2 there is shown an analysis class diagram showing the system of the invention. A typical business intelligence installation comprises software that typically employs at least one metadata layer that allows the software user to understand a data source. The business intelligence software will also often employ report specifications and/or analysis cubes that are built on top of and use the metadata layer to understand the data source.

FIG. 2 illustrates the system of the invention working in conjunction with the business intelligence software installation. The purpose of the invention is to continuously monitor, verify, and report on the business intelligence software. This is done via an automated agent that executes one or more test cases that are comprised within a test suite. The invention also automatically stores versions of the work done by the business intelligence software user.

Although preferred embodiments of the invention have been illustrated in the accompanying Drawings and described in the foregoing Summary and Detailed Description, it will be understood that the invention is not limited to the embodiments disclosed, but is capable of numerous rearrangements, modifications, and substitutions of parts and elements without departing from the spirit of the invention.

What is claimed is:

1. In a general purpose computer, a method for automatically testing a business intelligence artifact in a business intelligence system, comprising:

authoring a business intelligence artifact in the business intelligence system, wherein the business intelligence artifact produces output when the business intelligence artifact is executed in the business intelligence system, and wherein the business intelligence artifact is selected from the group consisting of: a report specification and an analysis cube;

creating at least one assertion with conditions to determine whether the business intelligence artifact is functioning properly;

testing, with an automated agent interfaced with the business intelligence system, the business intelligence artifact to verify its proper functioning by determining whether the conditions of the at least one assertion are satisfied; and reporting if the conditions of the at least one assertion are not satisfied.

2. The method of claim 1, wherein the conditions of the at least one assertion comprise expectations pertaining to whether the business intelligence artifact successfully executes within a specified amount of time.

3. The method of claim 1, further comprising executing the business intelligence artifact in the business intelligence system to generate a business intelligence output.

4. The method of claim 3, wherein the conditions of the at least one assertion comprise expectations pertaining to the quantity of data in the business intelligence output.

5. The method of claim 3, wherein the conditions of the at least one assertion comprise expectations pertaining to the data content in the business intelligence output.

6. The method of claim 1, wherein the conditions of the at least one assertion comprise expectations pertaining to the format of the business intelligence artifact.

7. In a general purpose computer, a method for automatically testing a business intelligence artifact in a business intelligence system, comprising:

providing a business intelligence artifact in the business intelligence system, wherein the business intelligence artifact is a user-authored object that produces output when the business intelligence artifact is executed in the business intelligence system, and wherein the business intelligence artifact is selected from the group consisting of: a report specification and an analysis cube;

creating at least one pre-execution or post-execution assertion with conditions to verify the desired function of the business intelligence artifact;

testing, with an automated agent interfaced with the business intelligence system, the business intelligence artifact for problems by determining whether the business intelligence artifact satisfies the conditions of the at least one assertion before execution of the business intelligence artifact or by determining whether execution of the current version of the business intelligence artifact in the business intelligence system satisfies the conditions of the at least one assertion; and reporting errors in the business intelligence artifact if problems are detected during testing.

8. The method of claim 7, wherein providing the business intelligence artifact comprises authoring an original business intelligence artifact.

9. The method of claim 7, wherein providing the business intelligence artifact comprises revising an original business intelligence artifact.

10. The method of claim 7, wherein the conditions of the at least one assertion comprise expectations pertaining to whether the business intelligence artifact successfully executes within a specified amount of time.

11. The method of claim 7, wherein the conditions of the at least one assertion comprise expectations pertaining to the quantity of data in a business intelligence output generated by execution of the business intelligence artifact.

12. The method of claim 7, wherein the conditions of the at least one assertion comprise expectations pertaining to the data content in a business intelligence output generated by execution of the business intelligence artifact.

13. The method of claim 7, wherein the conditions of the at least one assertion comprise expectations pertaining to the format of the business intelligence artifact.

14. In a general purpose computer, a method for automatically testing a business intelligence artifact in a business intelligence system, comprising:

authoring a business intelligence artifact in the business intelligence system, wherein the business intelligence artifact produces output when the business intelligence artifact is executed in the business intelligence system, and wherein the business intelligence artifact is selected from the group consisting of: a report specification and an analysis cube;

executing the business intelligence artifact in the business intelligence system to generate a business intelligence output;

creating at least one assertion with conditions to verify the desired function of the business intelligence artifact when executed in the business intelligence system;

testing, with an automated agent interfaced with the business intelligence system, the business intelligence artifact for problems by determining whether the business intelligence output generated by the business intelligence artifact satisfies the conditions of the at least one assertion after execution of the business intelligence artifact in the business intelligence system; and reporting if the conditions of the at least one assertion are not satisfied after execution of the business intelligence artifact in the business intelligence system.

15. The method of claim 14, wherein the conditions of the at least one assertion comprise expectations pertaining to whether the business intelligence artifact successfully executes within a specified amount of time.

16. The method of claim 14, wherein the conditions of the at least one assertion comprise expectations pertaining to the quantity of data in the business intelligence output.

17. The method of claim 14, wherein the conditions of the at least one assertion comprise expectations pertaining to the data content in the business intelligence output.

* * * * *